United States Patent
Hill (10) Patent No.: US 6,851,620 B2
(45) Date of Patent: Feb. 8, 2005

(54) FLOATING ACTUATOR CONTROL SYSTEM AND METHOD

(75) Inventor: Michael L. Hill, Rockton, IL (US)

(73) Assignee: Invensys Building Systems, Inc., Rockford, IL (US)

( * ) Notice: Subject to any disclaimer, the term of this patent is extended or adjusted under 35 U.S.C. 154(b) by 0 days.

(21) Appl. No.: 10/427,317

(22) Filed: Apr. 30, 2003

(65) Prior Publication Data

US 2004/0217181 A1 Nov. 4, 2004

(51) Int. Cl.$^7$ .................................................. F24F 7/00
(52) U.S. Cl. ..................... 236/49.3; 236/78 C; 62/158; 251/129.01
(58) Field of Search ............................ 236/49.3, 78 C; 62/126, 157, 178, 158; 251/129.01

(56) References Cited

U.S. PATENT DOCUMENTS

| 5,318,104 A | * | 6/1994 | Shah et al. ................... 165/208 |
| 5,810,245 A | * | 9/1998 | Heitman et al. ........... 236/49.3 |
| 6,152,310 A | * | 11/2000 | Sakai et al. ................. 209/712 |
| 6,276,565 B1 | * | 8/2001 | Parsons et al. .............. 222/52 |
| 6,354,374 B1 | * | 3/2002 | Edwards et al. ........... 166/297 |

* cited by examiner

*Primary Examiner*—Marc Norman
(74) *Attorney, Agent, or Firm*—Leydig, Voit & Mayer, Ltd.

(57) ABSTRACT

A system and method of providing floating actuator control is provided. This system and method receives input command signals from an actuator controller, and effectively integrates these signals until the controller has requested a large enough movement of the actuator that the actuator can actually effectuate. At this point, the system and method drive the actuator to the commanded position. As a result, excessive mechanical wear in the actuator caused by small command signal perturbations and dither is reduced or eliminated.

21 Claims, 7 Drawing Sheets

FLOATING ACTUATOR CONTROL SYSTEM AND METHOD

FIELD OF THE INVENTION

The present invention relates generally to floating actuator control systems, and more particularly to a floating actuator control system and method that reduces dither and improves actuator motor control life.

BACKGROUND OF THE INVENTION

Heating, ventilating, and air conditioning (HVAC) systems have continued to evolve with a focus on greater efficiency, reliability, and greater human comfort. At a most basic level, an HVAC system exists in many homes. Such a basic system typically includes a thermostat, a furnace, and dampers on the various vents located in the rooms of the house. The resident sets a desired temperature on the thermostat, and when the ambient temperature falls below that set temperature, the thermostat commands the furnace to turn on. Individual room temperature control throughout the house is manually regulated by physically opening or closing the vent dampers. When the ambient temperature around the thermostat exceeds the set temperature by a given amount, the furnace is commanded off.

In such a basic on-off control mode, a typical controller could be a bi-metal switching element or a mercury switch activated by a bi-metal mechanism in the thermostat. In this forced air home furnace example, when the temperature is too cold the actuator open line is energized resulting in a valve or damper repositioned to increase heating. As the controlled space temperature increases the element activates the close line closing the damper or valve terminating the heating cycle. This type of control results in 100% or 0% heating and often has relatively large temperature swings.

Better control can be achieved with these simple controllers by adding a heating element with the bimetal and a "hold position" in the output. In the hold position the actuator's open and close control lines are de-energized. By activating the heating element when the actuator begins opening the open run time and the resulting heating effect can be limited. The net result is more even continuous heating.

In more complex HVAC systems, such as for large office buildings, malls, large apartment buildings, etc. such simple single thermostat control of the furnace is no longer practicable. In these larger, more complex installations, the furnace control is typically separate from the damper control, which is automated. That is, in such installations, the furnace may continue to run and provide heat to the entire building, even though a particular office does not require heat. The individual office or zone temperature control is provided by a thermostat that controls the position of the vent damper. When heating is required, the vent damper is commanded to open. When no heating is required, the vent damper is commanded to close.

To achieve more even heating in such installations in the various zones, sophisticated controllers and building automation systems are employed. Such systems use proportional through full proportional/integral/derivative (PID) control strategies. In addition to the PID control loop tuning constants, these controllers have parameters that customize their outputs for the particular actuating device. One type of algorithm that may be employed in these sophisticated controllers is a floating actuator output algorithm. Such an algorithm that generates an open command when the actuator is to be opened, generates a close command when the actuator is to be closed, and generates no command (open and close are floating) to hold the actuator in position.

A floating actuator has two input control signals, namely, drive open and drive close. In general, circuitry for generating and interpretation of such control signals is less costly than that required for analog control signals (e.g. 2V to 10V, 4 mA to 20 mA). Floating input signals are not continuous and higher voltage (usually 24V ac or dc) giving them higher noise immunity than analog control signal. Also, in general, with an analog control system the actuator must "know" what an input of 5V means (i.e. what percent of stroke). This requires a position measuring system within the actuator to achieve the proper commanded position. Further, the on-off-on (open-hold-close) control is more generic/universal than its analog counterpart (0 to 10V, 2 to 10V, 1 to 5 V, 4–20 mA, etc.).

In some cases the signals actually provide power to the motor (3 wire) in others the actuator is powered independently and the input lines are true control lines (4 or 5 wire). The actuator drives open when the open input signal is active and drives close when the close input signal is active. The actuator will hold position if both inputs are active and when no input is active. (Obviously, to hold position, spring return actuators are the independent power type).

When such a floating algorithm is used, the actuator's run time (time required to travel from zero to full stroke) must be entered as part of the control loop setup. This parameter allows the controller to position the actuator based upon the control loop demand signal. The loop is initialized by running the actuator to a known position, usually zero, by applying a close output signal for a time slightly longer than run time. Once the actuator's position is known, the controller keeps track of the time the open and close signals are activated and can calculate the actuators position and the runtime and direction necessary to achieve the desired operating point. Control strategies require precise timing to achieve such control. For example a typical floating control algorithm would, upon initiation/power application, activate the close input signal for a time period slightly longer than the actuator's run time. This action positions the actuator to a known start position (in this case full closed/zero). The control loop demand can be converted to a "drive time" floating control signal based upon the actuator's full stroke run time. For a demand of 50% output, the float open line is activated for one half the actuator's run time. If demand changes to require 60% output, the float open line is again activated for an additional 10% of run time.

When properly setup and tuned the controllers can provide very smooth, even control and rapid response to any temperature disturbance. The goal of such control is to achieve basically a constant temperature at the set point with very little temperature swing. The controllers attempt to achieve this temperature equilibrium by commanding more and finer output changes in the position of the actuator to compensate for the smallest disturbance in the sense temperature in the zone for which it is responsible. These small changes, when translated to the mechanical world of the damper, are often far more effective at wearing things out than making a noticeable control change in the physical position of the actuator.

That is, problems occur with high gain control loops (low throttling ranges) with minimum drive times of less than, e.g., 0.5% of stroke time. For example, with a 2° throttling range (TR) a temperature change of 0.01° would generate a minimum output (0.5%) drive pulse. Since 0.010° is within the noise band of most control systems, an ongoing random series of open and close drive signals are typically generated when at the control setpoint. When the setpoint is changed, a large loop error is generated that results in a large drive time output (1° change would result in a 50% of stroke drive time with a 2° TR). This results in a large change in loop heating (or cooling) which begins to reduce the loop error. As the error is reduced the actuator position is changed with a series of minimum drive time pulses. Although the pulses will trend in a single direction (open or close), because of the signal to noise ratio, control reversals/dithering can still be expected. Over time, this results in unacceptable wear on the actuator. With larger TR's the dithering may be eliminated but the slower changes in loop errors will result in every position change accomplished by a series of minimum drive time signals, which is also unacceptable.

Therefore, there exists a need in the art for an actuator drive that does not allow the floating actuator controller to damage the actuator, but that still provides accurate positioning of the actuator.

BRIEF SUMMARY OF THE INVENTION

In view of the above, the present invention provides a new and improved actuator control. More particularly, the present invention provides a new and improved actuator control for a floating actuator control system. Preferably, the floating actuator control system and method of the present invention eliminates or substantially reduces the wear resulting from dither and backlash, but still maintains accurate positioning of the actuator in accordance with the open and close command from an HVAC controller.

In a preferred embodiment of the present invention, the floating actuator control system and method provides an integration function of the input actuator control signals from the HVAC controller. Specifically, the system and method of the present invention tracks the input control signals from the HVAC controller, but only repositions the actuator once an accumulation of the control signals have commanded a change in position of the actuator that may actually be effectuated through the mechanical actuator and drive. In this way, excessive wear from short cycling/dithering may be reduced or eliminated.

Once the system and method of the present invention actually commands a movement of the actuator, this repositioning continues until the actuator reaches the accumulated position commanded by the series of input commands from the HVAC controller, thereby accurately positioning the actuator in accordance with the position at which the HVAC controller believes the actuator to be.

In an embodiment of the present invention, the system and method for the floating actuator control utilizes an accumulator that adds one count per cycle when the open command is present, and that subtracts one count per cycle when the close command is present. The accumulator tracks the command counts until a significant change in position has been requested by the HVAC controller. In a preferred embodiment, the determination of this significant amount is based upon a percentage of the actuator's traveling range. The percentage may vary depending on the control characteristics and the installation and installational requirements of the heating or cooling zone, and is typically set to between one and three percent. In one embodiment, a minimum one second drive time equating to 1.4 degrees of a 95 degree stroke is chosen. In this embodiment, a program cycle of 1/256 seconds is chosen, which correlates to an accumulator count of 256 before the actuator will be driven to a new position.

In this preferred embodiment, during the period that the actuator is closing, one count per cycle will be added to the accumulator, and one count will be subtracted during the period that the actuator is opening. In this way, the accumulator value will be driven to zero once the appropriate drive threshold has been reached. If the close or open command are still present during the period of repositioning of the actuator, the accumulator value will not change until the close or open command is removed, at which point the opening or closing will drive the accumulator value to zero. To prevent errors in the accumulator value, once the actuator has stalled open or closed (reached its end position) the appropriate accumulator counts will be cleared, and further drive commands to that stalled position will be ignored. That is, if the actuator is stalled open, the positive value of the accumulator will be reset, and further open command counts will be ignored. Likewise, if the actuator is stalled closed, the negative counts of the accumulator will be cleared and further close command counts will be ignored.

Other features and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
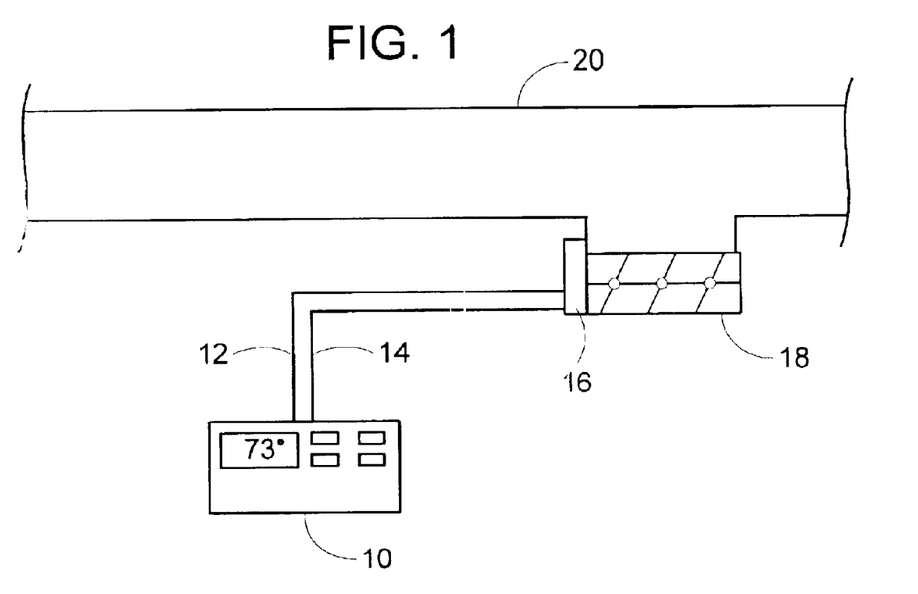
FIG. 1 is a simplified single line diagram illustrating a typical HVAC floating actuator control environment in which the system and method of the present invention find particular applicability.

While the system and method of the present invention are applicable to various installations and system configurations, FIG. 1 illustrates a typical installation that will aid in the understanding of the operation of the system and method of the present invention. As may be seen from this simplified FIG. 1, a temperature controller 10, which may or may not include remote temperature sensors, provides the control inputs for controlling the ambient temperature within its control zone. The setting and programming of this HVAC zone temperature controller is beyond the scope of the present invention, and will not be discussed herein except to say that the user may program the desired zone temperature and the controller 10 will process the temperature sense inputs to generate the floating actuator control signals. These control signals are illustrated in simplified form by close line 12 and open line 14. As discussed above, and as will be recognized by those skilled in the art, actuation of the close line 12 will cause the actuator controller 16 to close the dampers of the actuator 18. If the actuator dampers 18 are allowed to be closed fully, air flow from the heating or cooling duct 20 will no longer be able to flow into the controlled zone through the closed damper 18. Similarly, when the zone controller 10 desires the dampers 18 to be opened, it activates the open line 14 to command the damper actuator 16 to open the damper 18 to allow for or increase the air flow from duct 20 into the controlled zone. Once the damper 18 has been positioned as commanded by the temperature zone controller 10, this controller 10 allows both signal lines 12, 14 to float. These floating inputs are interpreted by the damper actuator controller 16 as a hold position command. As a result, the damper actuator controller 16 will not attempt to reposition the damper 18 further.

In a preferred embodiment of the present invention, the actuator controller 16 will respond to either AC or DC voltage inputs. These input lines 12, 14 typically present a load impedance of approximately 1 K ohm and 0.1 uF. The input circuits within the controller 16 that connect to these lines preferably have a threshold detector that requires about 12 Vdc or 9 Vac voltage to activate the drive. The relatively low impedance and threshold detector result in high noise immunity and reduced sensitivity to leakage currents, e.g. primary controller 10 triac output leakage and snubber bypass currents.

In an embodiment of the controller 16 that utilizes a half wave power supply, when AC is used as the input signal on lines 12, 14, the voltage is applied only during the positive half (24 H positive) line cycle. To provide a continuous signal, the controller 16 utilizes a "carry through" software timer to maintain the drive signal during the negative half line cycle. The timer is set to zero each time a floating input signal is detected and begins counting up. As long as the timer's value is less than 20 ms, regardless of input signal level, the floating input is considered active. In a preferred embodiment of the present invention, the floating control system and method is processed within controller 16 256 times a second. However, one skilled in the art will recognize that the cycle time may be varied as desired, with appropriate adjustments to the other parameters as will be made clear below.

When a drive open input signal is detected an "integrate up" flag is set. Likewise, if a drive close input is active an "integrate down" flag is set. The carry through timer is re-zeroed and the integrate flag(s) will remain set until the timer reaches 20 ms. The integrate up flag, when set, results in the addition of one count each program cycle (each 1/256 second) to a "drive time" accumulator and the integrate down flag, when set, results in the subtraction of one count from the accumulator each program cycle. When the accumulator reaches 256 counts the motor drive is activated in the open direction (−256 counts for close drive activation). When the open motor drive is active one count is subtracted from the drive time accumulator each pass. If the open input is also present the accumulator is increased and reduced by one count each pass (i.e. remains at 256 counts=1 second in this exemplary embodiment). The open motor drive will continue until the accumulator reaches zero or the actuator stalls. At the open stall point the accumulator is cleared if positive counts remain and the accumulation of positive counts is disabled. Negative counts are not effected. Likewise at close stall negative counts are cleared, the accumulation of negative counts is disabled, and positive counts are not effected.

Note that control inputs of longer than 1 second may be required before repositioning occurs. For example, if an accumulation in the open direction of 255 counts has occurred (256 needed in this exemplary embodiment before repositioning is commanded), a close input of about 2 seconds would be required for the accumulator to reach −256 counts (close start motor drive threshold). As will be recognized by those skilled in the art, 256 counts and 1 second are exemplary values for one embodiment of the present invention. For certain types of dampers, these values represent 1.4% of a 95-degree stroke.

This system and method of the present invention prevents the actuator controller 16 from responding to narrow input pulses from the zone controller 10, but still allows the accumulation of the total drive time of the pulses. Repositioning of the actuator occurs when an "effective" control response is indicated. Likewise, small position corrections (short input pulses) about an operating point (control point dither) are eliminated as the integration of a series of open and close inputs will have a canceling effect within the run time accumulator. The routine extends actuator life by eliminating "ineffective" repositionings while maintaining the integrity of control input to desired position.

Figure 2:
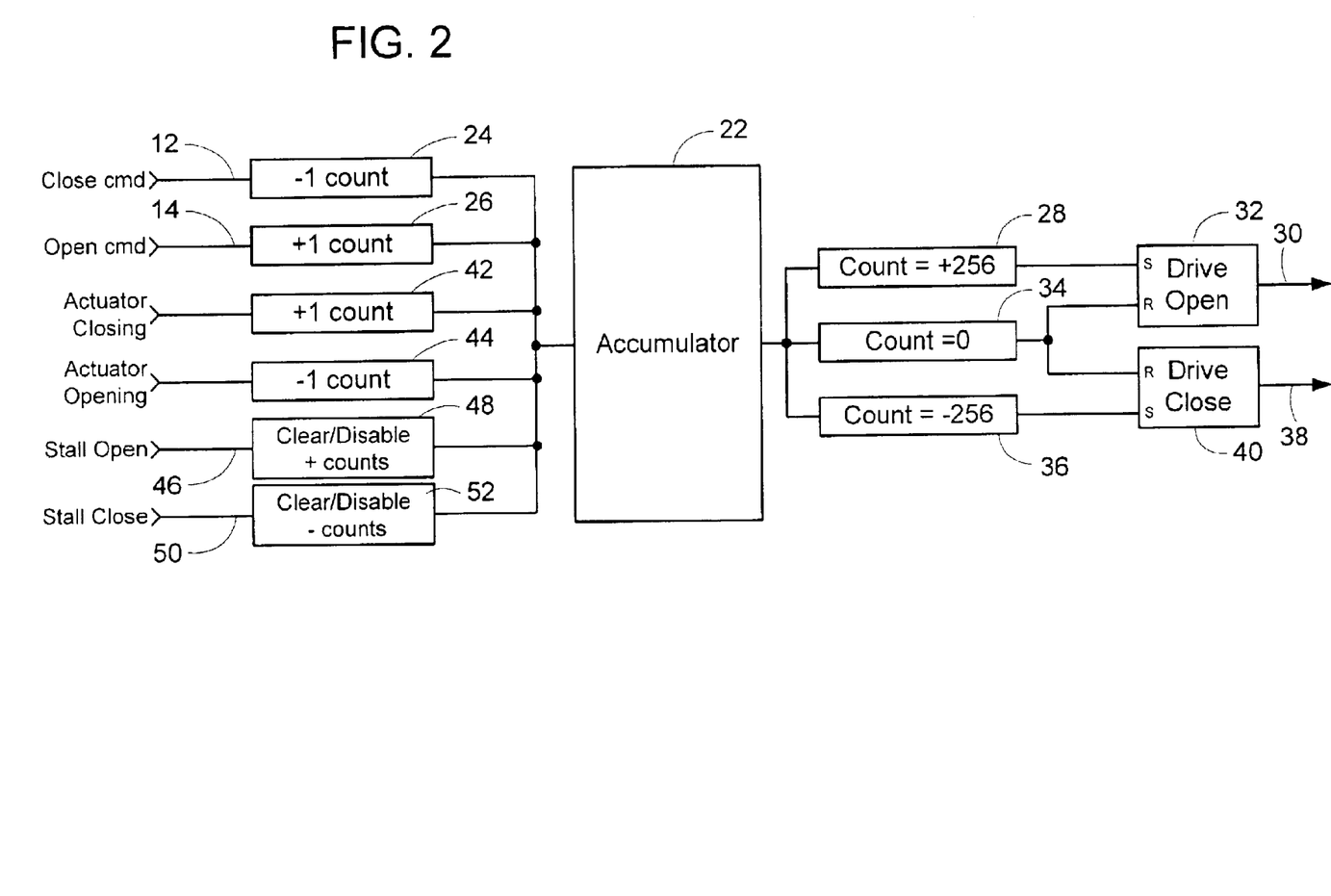
FIG. 2 is a functional block diagram illustration of the floating actuator control system of the present invention.

With this understanding of the system and method of the present invention now in place, attention is directed to FIG. 2 which illustrates in simple block diagrammatic form these operational characteristics of the present invention. As discussed above, the system of the present invention includes an accumulator 22 that keeps track of the commanded position of the actuator. During each cycle that the closed command 12 is present, a count is subtracted from the accumulator value 22 as illustrated by functional block 24 providing a negative one count input to accumulator 22. Conversely, when the open command 14 is present, functional block 26 illustrates that a positive one count is provided to the accumulator 22 to increase its value. Once this value reaches a predetermined positive value corresponding to the desired repositioning interval, illustrated in FIG. 2 by threshold functional block 28, the system of the present invention activates the drive open command 30 to reposition the actuator. As illustrated in FIG. 2, this drive open signal remains or is latched by functional block 32 until the count of accumulator 22 reaches zero as illustrated by functional block 34. In other words, once the accumulator 22 has counted to a value sufficient to activate the actuator, the activation continues until the position of the actuator achieves the commanded position. Similarly, when the accumulator value reaches a predetermined maximum negative value as indicated by functional block 36, the drive close control line 38 is activated. As with the drive open command 30, the drive close command 38 remains or is latched as illustrated by functional block 40 until the accumulator value reaches zero.

The mechanism by which the accumulator value is driven toward zero is illustrated by functional blocks 42, 44. As discussed above, the accumulator value must reach a maximum positive count before the drive open command 30 is initiated. While that command 30 is active, the actuator is opening and functional block 44 will subtract one from this maximum count value for each cycle that the actuator is opening. If the open command is not present during this opening, the accumulator value will be steadily reduced to zero. However, if the open command continues to be present, the accumulator value will remain at its maximum count as the open command count addition 26 is offset by the actuator opening reduction of a count 44. Similarly, once the drive close command 38 has been activated, the actuator is closing and functional block 42 adds a count to accumulator 22. Since the drive close command 38 is only initiated once the accumulator value reaches a maximum negative value 36, the addition of a count by functional block 42 will steadily drive the accumulator value from this maximum negative count value to zero. If the actuator close command is still active during this process, the negative count 24 supplied to the accumulator 22 is offset by the positive count 42 during the actuator closing so that the accumulator value remains at its maximum negative value as these two inputs offset. Once the close command 12 is removed, the continuing closing of the actuator will continue to add a count 42 to the accumulator 22 to steadily reduce its value to zero. As discussed above, once this count reaches zero 34 the drive command 38 will be reset.

If the actuator has been fully opened, the stall open input 46 will be set. This will result in the positive counts of the accumulator 22 being reset to zero, and the disabling of further positive count inputs from functional block 26 as illustrated by functional block 48. In other words, if the actuator is in its fully open position, the accumulator 22 will not be allowed to continue to represent or continue to establish a positive value, which represents a difference between the commanded and actual position of the actuator. Similarly, if the actuator is in its fully closed position, the stall close input 50 will be active. Through functional block 52, the negative counts in accumulator 22 will be clear, and further negative counts supplied by functional block 24 when the close command 12 is active will be disabled. By clearing either the positive or negative counts once the stall position is reached, the drive open command 30 or the drive close command 38 will be reset so that power is not continued to be applied to the actuator once it has already reached its maximum travel position. This provides an additional advantage of power savings.

Turning now to the programmatic flow diagrams of FIGS. 3–6, the various functions of the method of the present invention will be described. In a preferred embodiment, each of these programmatic flows will be processed during each cycle of the controller 16, although other processing paradigms may also be used with appropriate adjustment of the applicable parameters.

Figure 3:
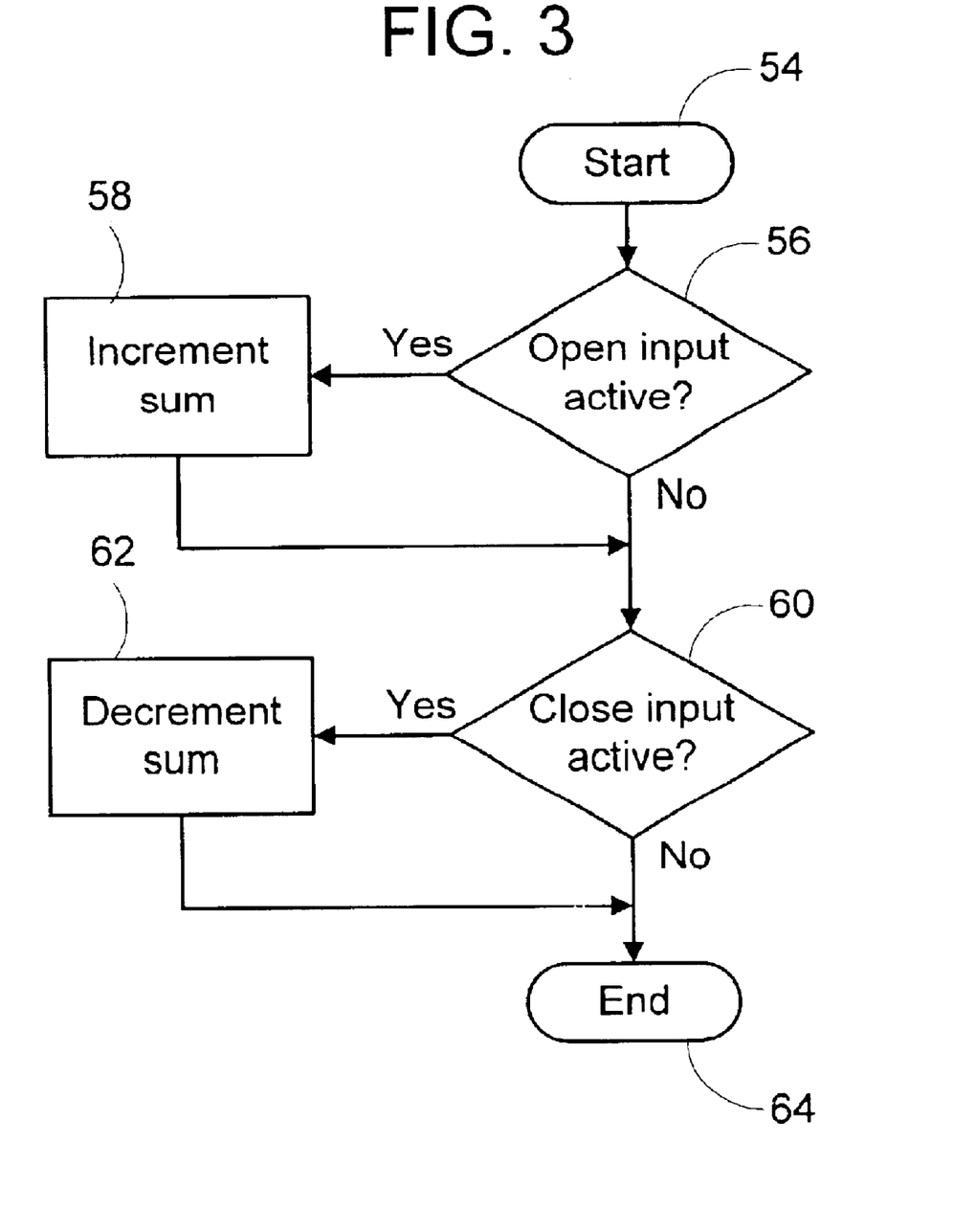
FIG. 3 is a programmatic flow diagram illustrating an accumulation function of the method of the present invention.

Once the process of FIG. 3 has begun 54, decision block 56 determines whether the open input is active. If the open input is active, the sum of the accumulator is incremented as illustrated by process block 58. If the open input is not active, this process block 58 is skipped. The method next determines whether the close input is active at decision block 60. If it is, the accumulator sum is decremented as indicated by process block 62. If not, this process block 62 is skipped before this function ends 64. It should be noted that the accumulator sum will not change if both the open input and the close input are inactive or floating, and when both the open input and the close input are active.

Figure 4:
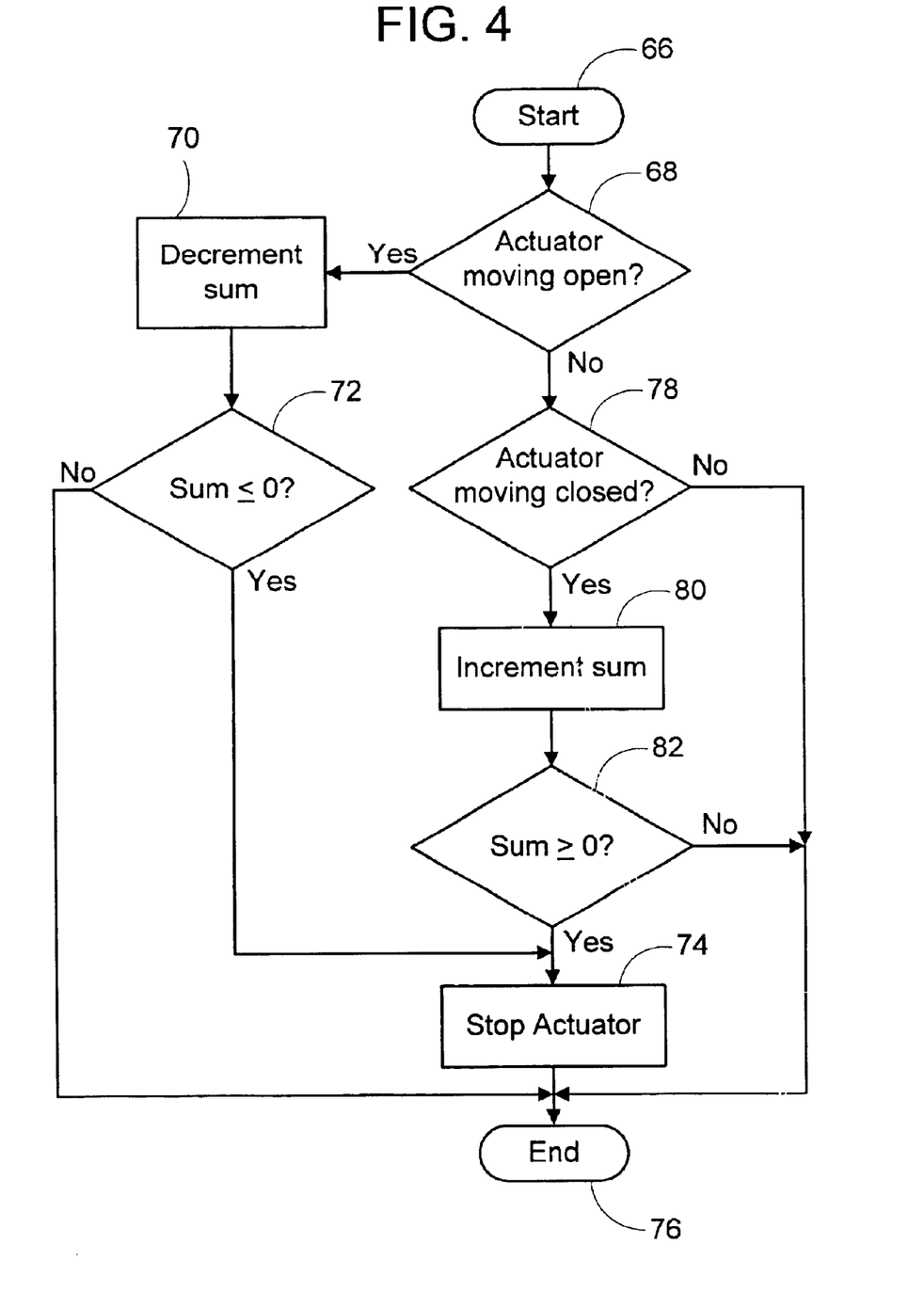
FIG. 4 is a programmatic flow diagram illustrating an actuator repositioning function of the method of the present invention.

Once the function of FIG. 4 has begun 66, decision block 68 determines whether or not the actuator is opening. If the actuator is opening, the sum of the accumulator is decremented as illustrated by functional block 70. This sum is then checked by decision block 72 to determine whether or not it has reached or exceeded zero. If the sum has reached or exceeded zero, the actuator command is removed to stop the actuator as indicated by functional block 74. If the sum has not reached or exceeded zero, this functional block 74 is skipped before terminating 76. If the initial decision block 68 determines that the actuator is not moving in an open direction, decision block 78 determines whether the actuator is moving in a close position. If the actuator is closing, the sum of the accumulator is incremented as indicated by functional block 80. Once the accumulator sum has been incremented 80, decision block 82 determines whether the accumulator sum ahs reached or exceeded zero. If the sum has reached or exceeded zero, the actuator is stopped as indicated by functional block 74, if the sum has not reached or exceeded zero, then the actuator is allowed to continue closing by skipping functional block 74. Back at decision block 78, if it is determined that the actuator is not closing, the functional and decision blocks 80, 82 and 74 are all skipped for this process is terminated 76.

Figure 5:
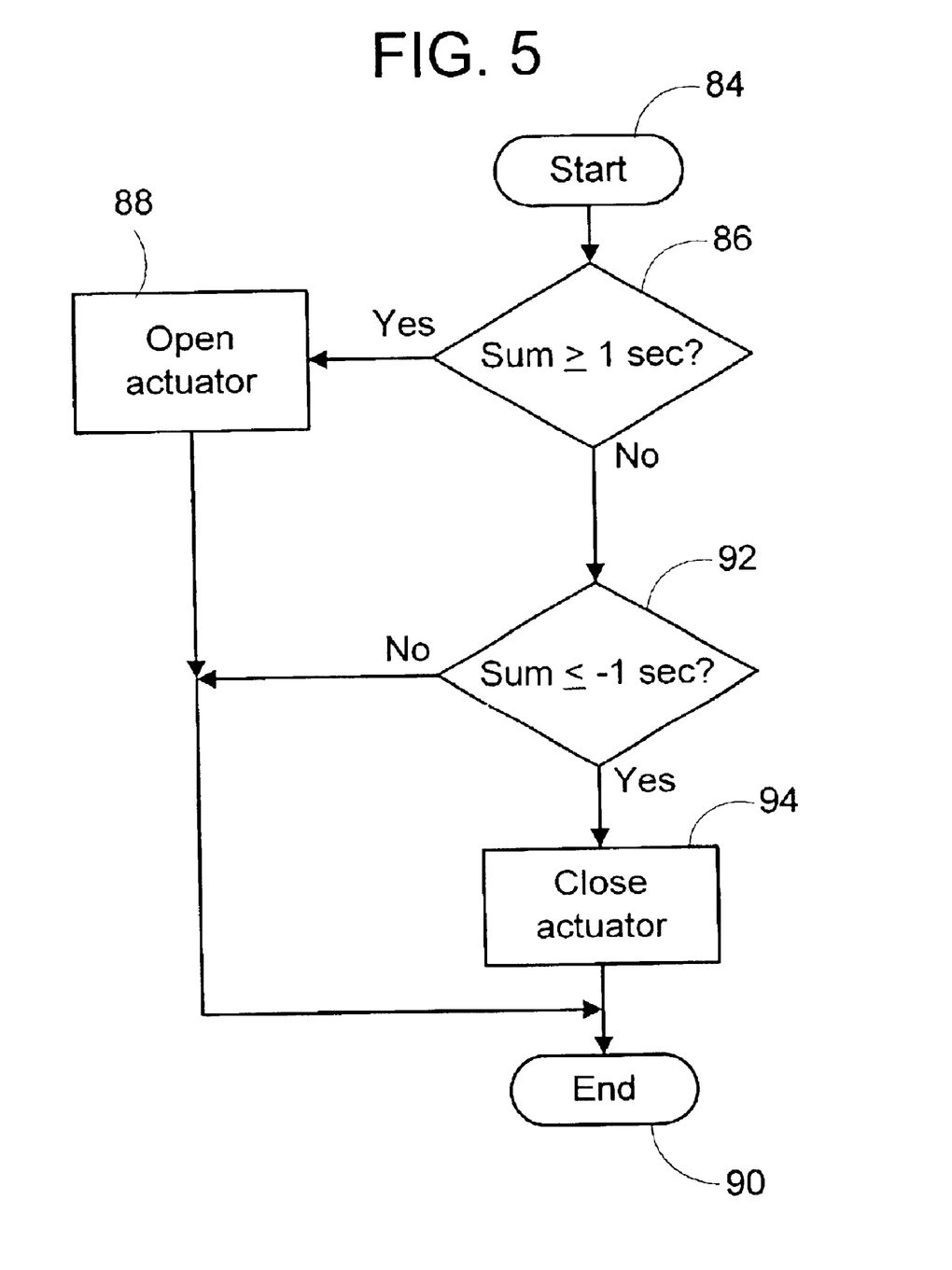
FIG. 5 is a programmatic flow diagram illustrating an actuator reposition initiation function of the method of the present invention.

Once the process of FIG. 5 starts 84, decision block 86 determines whether the accumulator sum has reached or exceeded the maximum set point (minimum actuator reposition set point). If the accumulator sum has reached or exceeded this maximum value, e.g. one second, then the actuator is commanded open by functional block 88 before the function is terminated 90. However, if the sum has not reached or exceeded the maximum value at decision block 86, decision block 92 determines whether or not the accumulator sum has reached or exceeded the maximum negative value. If it has, the actuator is commanded to close as indicated by functional block 94. If the accumulator sum has not reached maximum negative value at decision block 92, this functional block 94 is skipped before the process ends 90.

Figure 6:
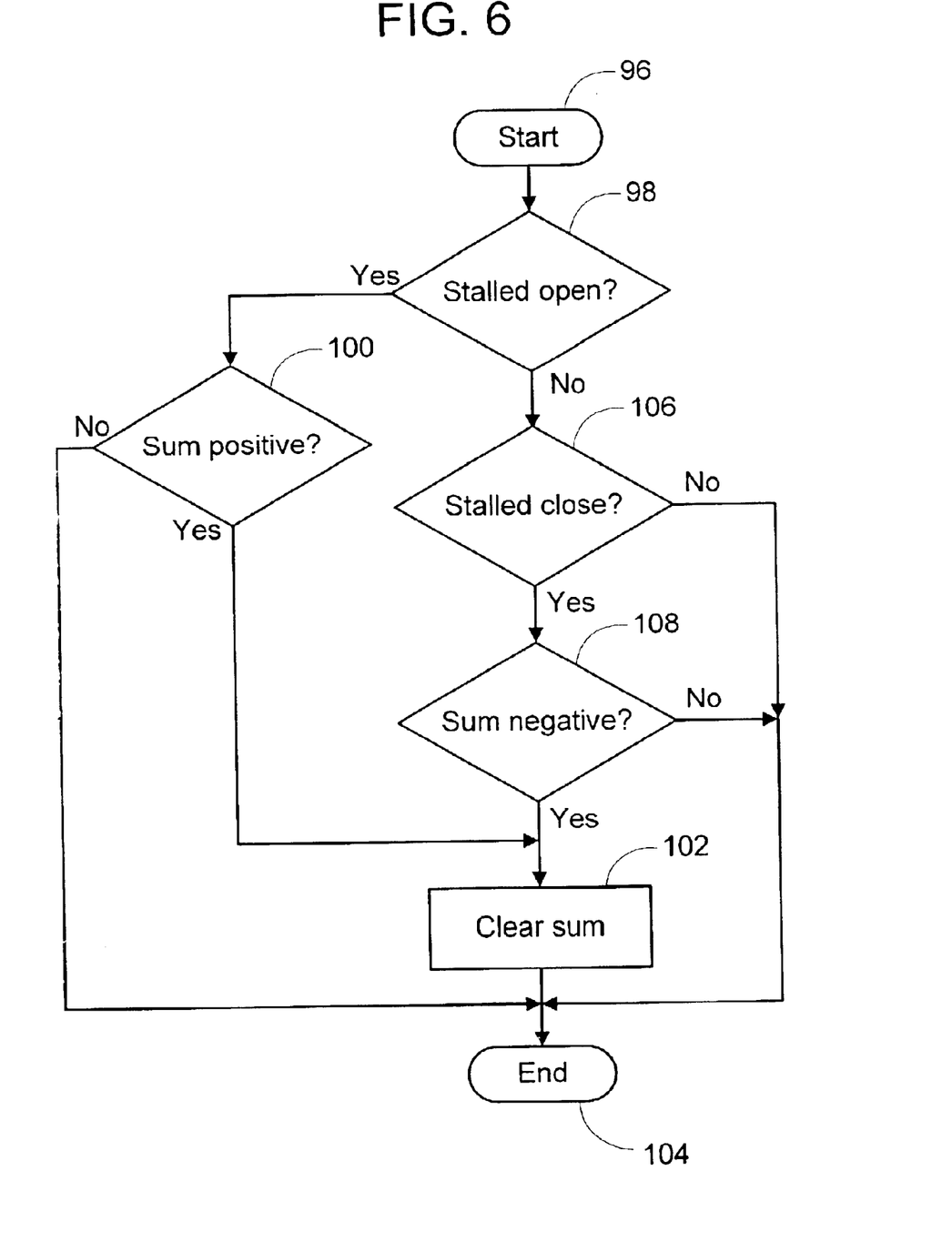
FIG. 6 is a programmatic flow diagram illustrating an actuator stall position recalibration function of the method of the present invention.

Once the process of FIG. 6 is begun 96 decision block 98 is used to determine whether the actuator has reached its stalled open position. If the actuator has reached the stalled open position, the sum of the accumulator is checked to determine whether or not there exists a positive sum at decision block 100. If there remains a positive sum in the accumulator, this sum is cleared at decision block 102 before this process ends 104. However, if the accumulator sum is not positive at decision block 100, functional block 102 is skipped before ending 104. If the initial determination of decision block 98 is that the actuator is not stalled open, decision block 106 is processed to determine whether or not the actuator is stalled in its closed position. If the actuator is stalled in its closed position, decision block 108 checks to determine whether the accumulator has a residual negative sum. If it does, then the accumulator negative value is cleared as indicated by functional block 102 before the process ends 104. However, if the sum is not negative at decision block 108, then this function 102 is skipped. If the decision at decision block 106 is that the actuator is not in its stalled close position, both the decision block 108 and functional block 102 are skipped before the process ends 104.

Figure 7:
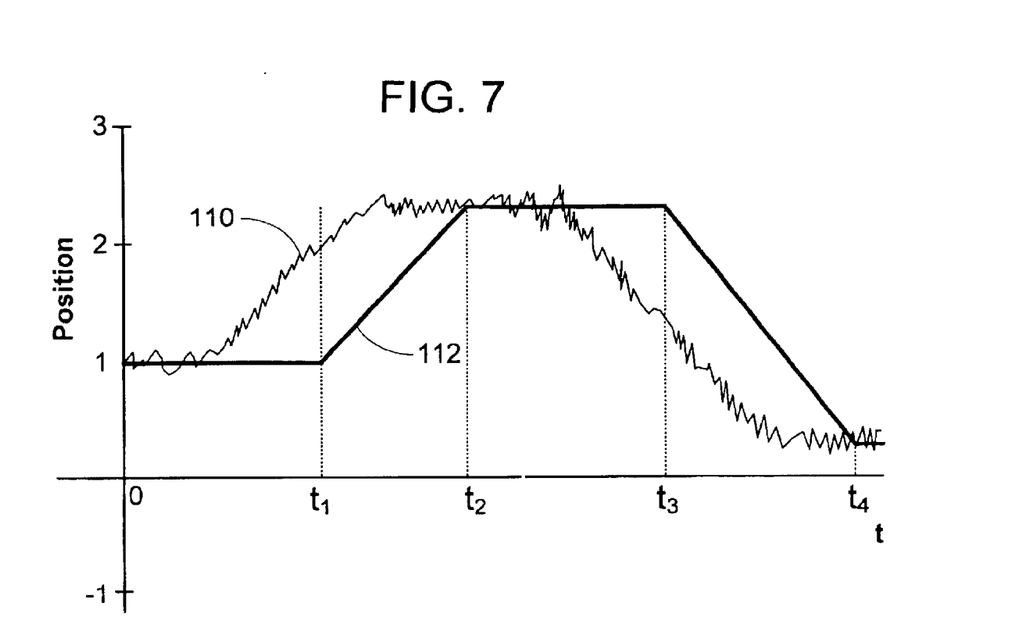
FIG. 7 is a graphical illustration of an actuator repositioning operating under the control of the system and method of the present invention.

With an understanding of both the system and method of the floating actuator control of the present invention, the graphical illustrations of FIGS. 7 and 8 will be discussed to gain a functional understanding of the result of operation of the system and method of the present invention. Referring specifically to FIG. 7, there is illustrated a graphical representation of the commanded actuator position from the zone controller by trace 110. The actual actuator position driven by the system and method of the present invention is illustrated by trace 112. As may be seen by this FIG. 7, the commanded position 10 from the zone temperature controller varies in many incremental changes based on its processing of its internal control algorithms to attempt to reposition the actuator to achieve the equilibrium it seeks. However, the floating actuator control system and method of the present invention does not vary the actuator until the minimum repositioning set point is reached. This point is illustrated at time $T_1$ when the difference between the actual actuator position 112 and the commanded actuator position 110 reaches, for example, one second. Beginning at time $T_1$ the actuator is commanded to open. Initially during this period of driving the actuator, the zone controller continues to command the position of the actuator still further open. During this initial period, as will be evident from the discussion above, the movement of the actuator and the continuance of the open command offsets one another. As a result, the actuator continues to open until the accumulator value reaches or exceeds zero as indicated at time $T_2$. Once this position has been reached, the actual actuator position 112 has reached the position commanded by the zone controller. During the period from $T_2$ to $T_3$, the zone controller continues to make fine adjustments to its commanded position 10 of the actuator without any actual change in the position of the actuator as indicated by trace 112. However, at times $T_3$, the maximum value of the accumulator has reached its maximum negative, resulting in the system and method of the present invention to command the actuator closed. This actuator closing is continued until the accumulator value reaches or exceeds zero, which occurs at time $T_4$. As with the opening of the actuator, the closing of the actuator is continued until it achieves the commanded position by the zone controller.

Figure 8:
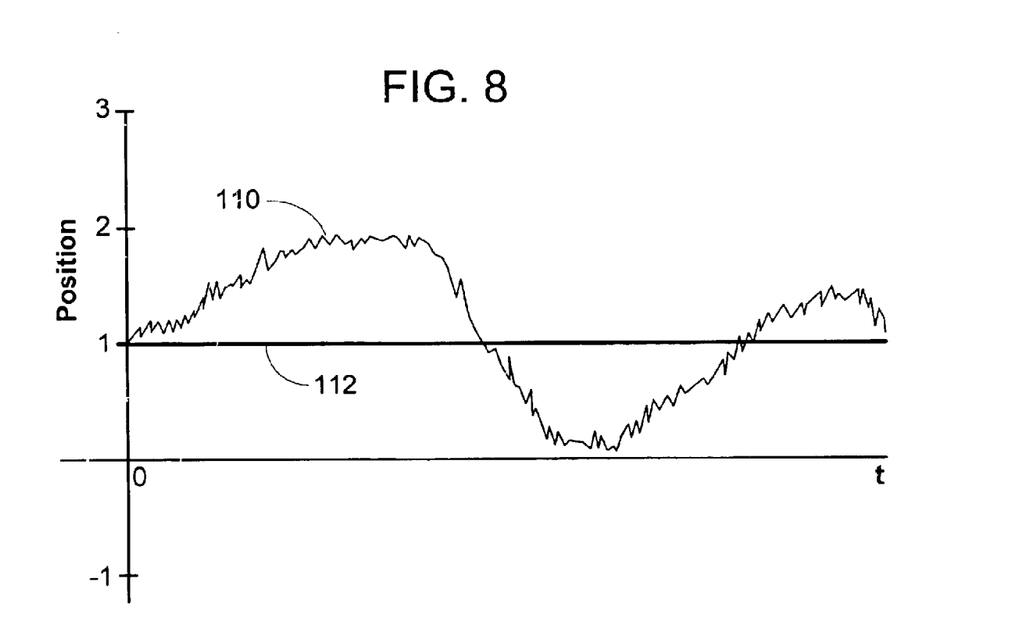
FIG. 8 is a further graphical illustration of the positioning of the actuator by the floating actuator control system and method of the present invention.

As illustrated in FIG. 8, the commanded position of the actuator by the zone controller may vary over the entire range between the maximum positive and maximum negative set values without having any actual effect on the position of the actuator 112. In a system in which the maximum positive and negative values are set based upon the actual response time of the mechanical actuator, this "ignoring" of the command signal eliminates the dither and resulting wear and tear on the actuator system that would otherwise result. However, it should be noted that the input command is never actually "ignored", but is merely stored within the accumulator until a sufficient change in position has been commanded that the floating actuator controller of the present invention can actually effectuate. At that point, the actuator is driven to that commanded position as illustrated above in FIG. 7.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of controlling an actuator, comprising the steps of:

receiving at least one of an actuator close command and an actuator open command from an external primary controller;

accumulating information relating to a duration of the at least one of the actuator close command and the actuator open command; and delaying driving the actuator until the accumulated information exceeds a predetermined threshold.

2. The method of claim 1, wherein the step of driving the actuator when the accumulated information exceeds the predetermined threshold comprises the step of setting the predetermined threshold to a time value that provides an effective control response from the actuator.

3. A method of controlling an actuator, comprising the steps of:

receiving at least one of an actuator close command and an actuator open command from an external primary controller;

accumulating information relating to a duration of the at least one of the actuator close command and the actuator open command;

driving the actuator when the accumulated information exceeds a predetermined threshold;

wherein the step of driving the actuator when the accumulated information exceeds the predetermined threshold comprises the step of setting the predetermined threshold to a time value that provides an effective control response from the actuator; and wherein the step of accumulating information relating to the duration of the at least one of the actuator close command and the actuator open command is processed a predetermined number of times per second, and wherein the step of accumulating information comprises the steps of increasing a count by an integer when one of the actuator close command and the actuator open command is received and decreasing the count by the integer when the other of the actuator close command and the actuator open command is received.

4. The method of claim 3, further comprising at least one of the steps of adding a count of opposite polarity of the count added during the actuator close command during the step of driving the actuator closed and adding a count of opposite polarity of the count added during the actuator open command during the step of driving the actuator open.

5. The method of claim 4, further comprising the step of stopping the actuator when the count reaches zero.

6. A method of controlling an actuator, comprising the steps of:
   receiving at least one of an actuator close command and an actuator open command from an external primary controller;
   accumulating information relating to a duration of the at least one of the actuator close command and the actuator open command;
   driving the actuator when the accumulated information exceeds a predetermined threshold; and
   further comprising the step of reducing the accumulated information during the step of driving.

7. A method of controlling an actuator, comprising the steps of:
   receiving at least one of an actuator close command and an actuator open command from an external primary controller;
   accumulating information relating to a duration of the at least one of the actuator close command and the actuator open command;
   driving the actuator when the accumulated information exceeds a predetermined threshold; and
   further comprising at least one of the steps of disabling further accumulation of information relating to the duration of the actuator close command when the actuator is stalled closed, and disabling further accumulation of information relating to the duration of the actuator open command when the actuator is stalled open.

8. The method of claim 7, further comprising at least one of the steps of clearing the accumulation of information relating to the duration of the actuator close command when the actuator is stalled closed, and clearing the accumulation of information relating to the duration of the actuator open command when the actuator is stalled open.

9. A method of controlling an actuator, comprising the steps of:
   receiving at least one of an actuator close command and an actuator open command from an external primary controller;
   accumulating information relating to a duration of the at least one of the actuator close command and the actuator open command;
   driving the actuator when the accumulated information exceeds a predetermined threshold; and
   wherein the step of driving the actuator when the accumulated information exceeds a predetermined threshold comprises the step of driving the actuator when the accumulated information indicates that one of the actuator drive open command and the actuator drive close command has accumulate to approximately one second.

10. A floating actuator control system for use in a heating, ventilating, and air conditioning (HVAC) system, comprising:
   a damper providing a variable opening to allow fluid communication from the HVAC system to a zone;
   a primary zone temperature controller positioned to sense ambient temperature of the zone, the primary zone temperature controller generating a damper close command and a damper open command, the primary zone temperature controller allowing the damper close command and the damper open command to float when movement of the damper is not required;
   an actuator drivably coupled to the damper; and
   a floating actuator controller operatively coupled to the actuator, the floating actuator controller configured to receive the damper close command and the damper open command from the primary zone temperature controller; and
   wherein the floating actuator controller receives at least one of the damper close command and the damper open command from primary zone temperature controller, accumulates information relating to a duration of the at least one of the damper close command and the damper open command, and drives the actuator when the accumulated information exceeds a predetermined threshold.

11. The system of claim 10, wherein the predetermined threshold is set to a time value that provides an effective control response from the actuator.

12. The system of claim 11, wherein the floating actuator controller processes the accumulation of information a predetermined number of times per second, and wherein the accumulation of information comprises increasing a count by an integer when one of the damper close command and the damper open command is received and decreasing the count by the integer when the other of the damper close command and the damper open command is received.

13. The system of claim 12, wherein the floating actuator controller adds a count of opposite polarity of the count added during the actuator close command while driving the actuator closed and adds a count of opposite polarity of the count added during the actuator open command while driving the actuator open.

14. The system of claim 13, wherein the floating actuator controller stops the actuator when the count reaches zero.

15. The system of claim 10, wherein the floating actuator controller reduces the accumulated information while driving the actuator.

16. The system of claim 10, wherein the floating actuator controller disables further accumulation of information relating to the duration of the damper close command when the damper is stalled closed, and disables further accumulation of information relating to the duration of the damper open command when the damper is stalled open.

17. The system of claim 16, wherein the floating actuator controller clears the accumulation of information relating to the duration of the damper close command when the damper is stalled closed, and clears the accumulation of information relating to the duration of the damper open command when the damper is stalled open.

18. A method of controlling an actuator, comprising the steps of:
   incrementing an accumulated sum each cycle that an actuator open command is present;
   decrementing the accumulated sum each cycle that an actuator close command is present;
   driving the actuator open when the accumulated sum reaches a predetermined positive valve; and
   driving the actuator closed when the accumulated sum reaches a predetermined negative value.

19. The method of claim 18, further comprising the steps of:
   decrementing the accumulated sum each cycle that the actuator is being driven open; and
   incrementing the accumulated sum each cycle that the actuator is being driven closed.

20. The method of claim 19, further comprising the step of stopping the actuator when the accumulated sum reaches zero.

21. The method of claim 18, further comprising the steps of:
   clearing a positive accumulated sum when the actuator is stalled open; and
   clearing a negative accumulated sum when the actuator is stalled closed.

* * * * *